Patented Sept. 22, 1931

1,824,757

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

COATING COMPOSITION

No Drawing.     Application filed December 24, 1927. Serial No. 242,530.

This invention relates to a quick-drying coating composition and binding and cementing agent, and relates especially to subject matter disclosed in my co-pending applications including Serial No. 117,152 filed June 19, 1926 and No. 214,781 filed August 22, 1927, of which applications the present application is a continuation in part.

In the employment of highly volatile solvents in lacquer compositions containing nitrocellulose and resin, difficulty arises due to a peculiar irregularity of the surface of the film, obtained from such lacquer, this condition of the surface being called "orange peel", due to the similarity in appearance to the exterior surface of orange rind.

It is an object of the present invention to utilize nitrocellulose of the intermediate viscosity type within the range of from about 4 to 10 seconds viscosity which may be employed advantageously with cheap low-boiling solvents, such, for example, as anhydrous methyl alcohol, particularly that made by catalytic synthesis from carbon monoxide and hydrogen.

Example 1

Nitrocellulose 200 grams, dibutyl phthalate 200 cc., and synthetic methanol 1 litre, (substantially anhydrous) are mixed. 200 grams cottonseed phthalic glyceride resin, such as that described in the applications referred to above, and 1 litre of benzol likewise are mixed. When solution of the solids is secured the two solutions are mixed.

On applying a coating of this solution to a surface, for example, glass, there is slight initial blushing, but the dry film is clear. It is, however, reticulated with the orange peel effect.

The following example of a cottonseed phthalic glyceride resin taken from Serial No. 117,152 is exemplary. 47 parts by weight of glycerol are added to 80 parts by weight of phthalic anhydride and 40 parts by weight of the distilled fatty acids obtained from cottonseed oil. The mixture is heated in a suitable container such as an aluminum kettle, preferably closed at the top, except for an air-cooled reflux condenser, and the mixture is heated slowly, preferably with mechanical agitation, to a temperature of about 280° C. until a sample of the mixture has shown the desired hardness or the acidity has been sufficiently reduced, e. g. so as to have an acid number of substantially less than twenty.

Example 2

To a mixture in the same proportions as disclosed in Example 1, 10 grams paraffin wax (melting point 133° F.) was incorporated. This gave a clear solution at temperatures above 65° F., but somewhat below that temperature cloudiness sets in due to separation of wax. The presence of the wax in this composition reduces orange peel because evaporation of the solvents is not as rapid.

When using coating compositions containing wax it is desirable to keep the temperature above the point at which cloudiness occurs.

A composition such as that just described may be used for coating paper, which when hot-calendered, has desirable grease-resisting qualities, as described in Serial No. 214,781.

Example 3

When the resin component in Example 1 is increased from 200 grams to 600 grams, the film dries clear and bright with orange peel practically eliminated. The film, is, however, too soft with plasticizer in the proportions used in Example 1, and the dibutyl phthalate or other plasticizing agent may be reduced, or preferably entirely omitted.

Example 4

200 grams nitrocellulose, 150 cc. dibutyl phthalate, 1 litre synthetic methyl alcohol (substantially anhydrous) are mixed. 800 grams cottonseed phthalic glyceride resin are dissolved in 1 litre of benzol. The two solutions are mixed.

There is no initial blush on applying the coating (in a normally dry atmosphere). Orange peel is almost undetectable.

It should be noted, however, that on heavily diluting the composition of Example 4, by adding highly volatile solvents, initial blushing and orange peel surface reappear.

The proportions of nitrocellulose and resin therefore have to be adjusted, with respect to the proportion of solvent present.

*Example 5*

A composition was made without plasticizer in the proportion of 200 grams nitrocellulose, 850 grams cottonseed phthalic glyceride resin, and 1 litre each of benzol and synthetic methyl alcohol as aforesaid.

A clear film without initial blush was obtained. The surface was hard and there was no trace of orange peel.

*Example 6*

A composition was made in a proportion of 200 grams nitrocellulose, 150 grams dibutyl phthalate, 2 litres synthetic methyl alcohol, 800 grams of the same cottonseed resin, and 400 cc. of the monoethyl ether of ethylene glycol.

In preparing this composition the resin was warmed with the methyl alcohol and the plasticizer. The resin dissolved but yielded a slightly turbid solution. The nitrocellulose was dissolved in this mixture and finally the ethyl glycol compound ("Cellosolve") was added. When warm the mixture was clear, but at room temperature it was turbid. However the film which was formed on applying on a thin layer to glass dried clear, without orange peel.

To render the solution clear there may be added a small amount of hydrocarbon solvent. Thus to 100 cc. of the coating composition there may be added 5.3 cc. of spirits of turpentine. A clear coating solution results. Since the synthetic methyl alcohol is cheaply obtainable practically free from odor, the addition of the turpentine gives to the composition a turpentine odor which is pleasing, and much more acceptable than compositions made with butyl acetate, amyl acetate, and the like.

100 cc. of the solution likewise may be cleared on the addition of 11 cc. of petroleum naphtha. In this case the composition has the odor of the naphtha.

In both of the last mentioned cases there is no initial blush, and clear films free from orange peel result.

The foregoing compositions may be employed with pigments to produce lacquer enamels, or they may be used to make grease-resisting paper, or they may be incorporated with various fibrous and other filling materials, the solvent evaporated, and the composition hot-pressed to make molded articles.

Other light or heavy volatile solvents may be used in conjunction with the synthetic methyl alcohol, or in some cases may replace it entirely as illustrated in Serial No. 117,152 and Serial No. 214,781. For example as set forth in Serial No. 117,152, by incorporating with nitrocellulose synthetic resins highly compatible therewith and in some cases even having a slight solvent or colloiding action on the nitrocellulose, I may employ various low boiling solvents such as acetone, methyl acetone, methyl acetate, ethyl acetate, and the like, and obtain from such solutions clear and transparent films of satisfactory strength, thus making unnecessary the use of high boiling solvents or special drying conditions. This, of course, is of considerable economic advantage, when rapid drying is desired. High boiling solvents such as amyl acetate, butyl acetate, ethyl lactate may also be used as set forth in Serial No. 214,781.

Likewise other compatible resins other than the cottonseed resin specifically employed as an illustration may be used, including any of the phthalic glyceride resins set forth in my co-pending applications, and other analogous resins. Thus as stated in Serial No. 117,152, resins made from an organic acid such as phthalic, citric, tartaric, maleic, malic, from a polyhydric alcohol such as glycerol, ethylene glycol, propylene glycol, mannitol, pentaerythritol, and from fatty acids of various oils such as cottonseed oil, linseed oil, or by means of monobasic carboxylic acids such as benzoic, salicylic, benzoyl benzoic acid and the like, may be used. To these compositions there may be added if desired, natural resins, such as rosin or the modified product, rosin ester, also phenol formaldehyde resins, and various modifications of such resins, such as rosin phenol formaldehyde resin. Other resins which may be introduced are vinyl chloride and acetate resins, styrene resins, aldehyde resins, and the like.

Nitrocellulose preferably is of an intermediate viscosity type such as that set forth in my co-pending application Serial No. 240,941 filed Dec. 17, 1927. Nitrocellulose of lower viscosity such for example, as ½-second material, also may be used. The use of cellulose acetate, cellulose ethers, and so forth, with or without nitrocellulose, is not precluded, it being understood that appropriate solvents are used to meet the particular requirements of solubility of such bodies.

Thus, nitrocellulose of a viscosity ranging from 4 to 10 seconds may be employed to unusual advantage in forming a film or coating free from orange peel markings. Acetone may be admixed with the synthetic methanol to slightly reduce the viscosity of the composition.

The elimination of orange peel rugosity by the presence of a dereticulating or derugosifying agent or derugosifier present in derugosifying proportion provides the means of coating wood, metal or other surfaces with a smooth glossy film of attractive appearance, while availing of cheap and abundant solvents of a highly volatile character.

I do not use the word "reticulate" in the sense of "veined" but rather to designate the irregularly channelled surface appearance of the skin of the orange with its closely set rugosities due to such recurrent channels.

From the compositions of the present invention, floor covering plastics may be made in the manner set forth in my co-pending applications on floor coverings. Serial No. 148,112 filed November 12, 1926, directed to floor coverings containing self-flattening layers of nitrocellulose of high and low viscosity and protective resins; Serial No. 149,528 filed November 19, 1926, directed to floor coverings comprising a tread layer of nitrocellulose, plasticizer, filler, and wax; and Serial No. 152,309, filed December 2, 1926, directed to articles consisting of paper carrying such compositions as a floor rug made from a flexible wax containing paper carrying a textured nitrocellulose tread composition. Oxidized resins such as are described in Serial No. 238,233 filed Dec. 6, 1927 may be employed in these plastics. Such oxidized resins may be prepared by pulverizing the resin and circulating air over it at a temperature slightly below the melting point of the resin. Rosin phthalic glyceride may be treated initially at 122° F. with a gradually increasing temperature up to 220° F. as the resin hardens. In like manner other resinous complexes such as rosin Congo phthalic glyceride resin; or rosin or other natural acid resins reacted on with succinic, benzoic, malic, maleic, or other acids, together with glycerol or glycol or glycol ethers, and the like may be similarly oxidized.

Especially light-colored coating compositions may be secured by the use of castor oil phthalic glyceride resin or benzoic phthalic gylceride resin. The glycol and glycol ether derivatives likewise are available.

The methanol which I prefer to use as a nitrocellulose solvent is that obtained by synthesis from the gaseous products of the fermentation of corn to make butyl alcohol and acetone. Traces of the latter are present in the methyl alcohol so derived. That used in the foregoing examples contained 0.097% by weight of acetone. The purity of the alcohol was 99.8%. It dissolves nitrocellulose freely and the solution will bear a high dilution with benzol and the like.

Alcohol of this type may be mixed with acetone and methyl acetate (e. g. using equal parts of each solvent) to yield an effective composite vehicle of utility in the present invention.

Attention may be called to certain of my copending applications for related subject matter. For example No. 142,532 filed October 18, 1926, relates to coating compositions comprising a soluble cellulose compound and containing a protective resin produced from a polyhydric alcohol such as glycerol, ethylene glycol, etc., and acid ingredients such as phthalic, tartaric, etc., and a fatty oil acid such as linseed oil acid, cottonseed oil acid, blown rape seed oil acid, soya bean oil acid, benzoic acid, and castor oil. Serial No. 144,647 filed October 27, 1926, relates to compositions involving the use of distilled fatty acids and particularly distilled fatty acids derived from the oils mentioned above in the making of resins which are utilized in nitrocellulose compositions. Application Serial No. 22,882, filed August 13, 1925, is directed to the complex resinous derivatives obtained from the polyhydric alcohol, an organic acid such as phthalic anhydride or its equivalent mentioned above, and a hydroxylated fatty acid such as ricinoleic acid. Application No. 61,839 filed October 10, 1925, relates to resinous complexes produced from a polyhydric alcohol, an organic acid such as phthalic anhydride or its equivalent, and an oily material such as a siccative oil, a blown oil, and oily fatty acid particularly those more unsaturated than oleic acid. Serial No. 181,892 filed April 7, 1927, relates to resinous compositions obtained by treating the glyceride type of resin with a reactive halide such as sulphur chloride. Application Serial No. 193,726 filed May 23, 1927, relates to synthetic products such as resins or balsams obtained by the reaction of an animal or vegetable oil, a glycol, and a crystalline organic acid. Serial No. 201,964, filed June 27, 1927, relates to synthetic resinous or resinoid products obtained by the reaction of substituted organic acids and glycol ethers or substituted polybasic carboxylic acids and resinifying polyhydric alcohols. Serial No. 213,695 filed August 17, 1927, is directed to composite reaction products obtained from a polyhydric alcohol, a polybasic carboxylic acid and a glyceride of a hydroxylated fatty acid. Serial No. 219,562, filed September 14, 1927, relates to complexes produced from crystalline organic acids such as phthalic acid or its equivalent, a polyhydric alcohol or glycol ether, and the fatty acids of a non-drying oil such as cocoanut oil. Serial No. 223,478, filed October 1, 1927 relates to resins and balsams produced from a polyhydric alcohol and a polybasic acid such as phthalic acid or its equivalent and an inorganic acid modifier of reaction which may be either basic or acid in character. Reference to these applications has been made to indicate the character of resins and other compositions which may be utilized in accordance with the present invention.

What I claim is:

1. A coating composition containing nitrocellulose of a viscosity of 4 to 10 seconds, and a compatible synthetic resin of the polyhydric alcohol-polybasic acid type, said resin being characterized by the property of solubility in a benzol anhydrous methylalcohol solvent mixture, the proportions of nitrocellulose to resin in the coating composition yielding a smooth hard film.

2. A coating composition containing nitrocellulose of a viscosity of 4 to 10 seconds, and a compatible synthetic resin, said resin being characterized by the property of solubility in a benzol anhydrous methylalcohol solvent mixture, the proportions of nitrocellulose to resin in the coating composition yielding a smooth hard film.

3. A coating composition containing nitrocellulose of a viscosity of 4 to 10 seconds, and a compatible synthetic resin of the polyhydric alcohol phthalic type, said resin being characterized by the property of solubility in a benzol anhydrous methylalcohol solvent mixture, the proportions of nitrocellulose to resin in the coating composition yielding a smooth hard film.

CARLETON ELLIS.